United States Patent
Lennevi et al.

(10) Patent No.: US 10,024,258 B2
(45) Date of Patent: Jul. 17, 2018

(54) METHOD AND AN APPARATUS FOR CONTROLLING THE REGENERATION OF AN EXHAUST GAS AFTERTREATMENT DEVICE

(71) Applicant: VOLVO TRUCK CORPORATION, Göteborg (SE)

(72) Inventors: Jerker Lennevi, Lerum (SE); Tommy Hjelle, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 109 days.

(21) Appl. No.: 15/036,067

(22) PCT Filed: Nov. 13, 2013

(86) PCT No.: PCT/EP2013/003409
§ 371 (c)(1),
(2) Date: May 12, 2016

(87) PCT Pub. No.: WO2015/070887
PCT Pub. Date: May 21, 2015

(65) Prior Publication Data
US 2016/0265462 A1  Sep. 15, 2016

(51) Int. Cl.
*F02D 41/02* (2006.01)
*B60L 11/14* (2006.01)

(52) U.S. Cl.
CPC .......... *F02D 41/0245* (2013.01); *B60L 11/14* (2013.01); *F02D 41/022* (2013.01);
(Continued)

(58) Field of Classification Search
CPC .... F02D 41/0245; Y02T 10/642; Y02T 10/26; B60L 2270/12; B60L 2240/507; B60L 2240/36
See application file for complete search history.

(56) References Cited

U.S. PATENT DOCUMENTS 6,422,001 B1 * 7/2002 Sherman .................. B60K 6/46
180/65.1
8,266,890 B2 * 9/2012 Singh ...................... F01N 3/023
60/274
(Continued)

FOREIGN PATENT DOCUMENTS

DE   10 2011 065260 A1   5/2013
EP       2 213 540 A1     8/2010
JP       2013075534 A     4/2013

OTHER PUBLICATIONS

Japanese Official Action (dated Sep. 20, 2017) for corresponding Japanese App. 2016-530135.
(Continued)

Primary Examiner — Michael J Zanelli
(74) Attorney, Agent, or Firm — WRB-IP LLP

(57) ABSTRACT

A method is provided for providing a heat mode for an exhaust gas after treatment device in a vehicle, such as for regenerating an exhaust gas particulate filter in the exhaust gas after treatment device, the vehicle including an internal combustion engine, an electric machine, a transmission, and a clutch connecting the internal combustion engine to the transmission and driving wheels. The method includes the steps of establishing that a heat mode for the exhaust gas after treatment device, especially that regeneration of the exhaust gas particulate filter, is demanded, establishing that driving of the vehicle is demanded, and during a period when the clutch is at least partially decoupling the transmission, providing at least a predominant part of a required driving torque to the driving wheels by the internal combustion engine, such that exhaust gases from the internal combustion engine are heating the exhaust gas after treatment device, and especially the exhaust gas after treatment device, preferably heating the exhaust gas particulate filter for regeneration thereof. The present disclosure also relates to a vehicle, a computer program, a computer readable medium and a control unit.

23 Claims, 4 Drawing Sheets

(52) U.S. Cl.
CPC ....... *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2270/12* (2013.01); *Y02T 10/26* (2013.01); *Y02T 10/642* (2013.01); *Y02T 10/70* (2013.01); *Y02T 10/7077* (2013.01)

(56) References Cited

U.S. PATENT DOCUMENTS

| | | | | |
|---|---|---|---|---|
| 9,254,838 | B2* | 2/2016 | Whitney | B60W 10/06 |
| 2003/0145582 | A1* | 8/2003 | Bunting | F01N 3/023 60/297 |
| 2008/0053074 | A1* | 3/2008 | Verkiel | B60W 10/02 60/295 |
| 2009/0033095 | A1* | 2/2009 | Aswani | B60W 10/06 290/2 |
| 2011/0257821 | A1* | 10/2011 | Beaucaire | B60W 10/06 701/22 |
| 2013/0091828 | A1* | 4/2013 | In | F01N 3/101 60/274 |
| 2014/0074386 | A1* | 3/2014 | McGee | B60W 50/0097 701/113 |

OTHER PUBLICATIONS

International Search Report (dated May 30, 2014) for corresponding international App. PCT/EP2013/003409.

* cited by examiner

METHOD AND AN APPARATUS FOR CONTROLLING THE REGENERATION OF AN EXHAUST GAS AFTERTREATMENT DEVICE

BACKGROUND AND SUMMARY

The present disclosure relates to a method providing a heat mode for an exhaust gas after treatment device in a vehicle, such as for regenerating an exhaust gas particulate filter in the exhaust gas after treatment device, the vehicle comprising an internal combustion engine, an electric machine, a transmission, and a clutch connecting the internal combustion engine to the transmission and driving wheels. The present disclosure also relates to a vehicle, a computer program, a computer readable medium and a control unit.

All vehicles, and in particular heavy duty trucks and buses, which have a hybrid driveline are generally provided with an internal combustion engine which does not suffice for all driving conditions of the vehicle. Instead an electric machine is added which used to support the internal combustion engine, or even singlehandedly drive the vehicle during certain driving conditions. The latter is particularly beneficial at times when low fuel consumption is sought, when low or no exhaust emissions are wanted, or when low noise levels are advantageous. The electric machine is not only operating as a vehicle driving machine, but is also operating as a generator, although at different occasions. It may thus deliver energy when there is an energy surplus to an energy storage, normally batteries, or to a super condenser or a flywheel for later use.

Many modern vehicles of these kinds are provided with an exhaust gas after treatment system (EATS). Especially heavy duty trucks and buses running on diesel fuel have such systems in order to meet emission regulations in different legislations. For these exhaust gas after treatment systems to function properly the fuel has to meet certain contents criteria, and the temperature of the system or of parts thereof have to be within certain limits, usually high enough to perform appropriately. A difficulty with regard to a hybrid driveline in particular in a driveline having a diesel internal combustion engine together with an electric machine, is that the exhaust gases which are resulting from the combustion of diesel fuel in the internal combustion engine may enter the exhaust gas after treatment system having a temperature which is too low to keep the exhaust gas after treatment system at a suitable temperature.

One part of such an exhaust gas after treatment system is a diesel particulate filter (DPF). During use of the filter emissions such as soot and particulates from the exhaust gases are collecting in the filter. The filter will over time lose its capacity to collect more particulates unless it is cleaned through intermittent regeneration. Detecting a need for DPF regeneration is often made through a pressure difference measurement between the outlet and the inlet of the filter. Regeneration may be achieved by increasing the temperature of the filter to such an extent that self-combustion of the particulates takes place. When it has been established that regeneration of the DPF is needed this can be achieved either at vehicle still stand or during driving. For initiation of the self-combustion external heating additional to the heat comprised in the exhaust gases may sometimes be required, but during regeneration such additional heating may be less needed since the heat generated by the self-combustion itself may be enough to keep the regeneration going.

One difference in driving conditions between hybrid passenger cars and hybrid heavy duty trucks and busses is that while the passenger car most often is driven such that a comfortable and calm driving style prevails, especially during acceleration, a heavy duty truck or bus instead is designed for applying frill power in order to perform well under similar conditions.

By the terms driving of the vehicle is meant to either start off from a still stand of the vehicle, or the propulsion of the vehicle such that it through possibly discontinuous speed travels a distance in a generally forward direction.

There is a continuous endeavour to improve the drivability and reduce the exhaust emissions from these types of vehicles.

It is desirable to overcome or ameliorate at least one of the disadvantages of the prior art, or to provide a useful alternative. It is moreover desirable to further improve the drivability and reduce the emissions from vehicles.

According to a first aspect of the present disclosure a method tier providing a heat mode for an exhaust gas after treatment device the vehicle is disclosed, which vehicle comprises an internal combustion engine, an electric machine, a transmission, and a clutch connecting the internal combustion engine to the transmission and driving wheels. The method comprises the steps of:

establishing that a heat mode for the exhaust gas after treatment device is demanded, establishing that driving of the vehicle is demanded, and during a period when the clutch is at least partially decoupling the transmission, providing at least a predominant part of a required driving torque to the driving wheels by the internal combustion engine, such that exhaust gases from the internal combustion engine are heating the exhaust gas after treatment device.

By performing this method it has surprisingly been found that the temperature of the exhaust gases are increased to such an extent that a heat mode for the exhaust gas after treatment device may be achieved without undue additional heating of either the exhaust gases or of the exhaust gas after treatment device, where it otherwise would not have been possible. Additional heating of e.g. the exhaust gases may still be either needed or necessary, but this additional heating is at least reduced in comparison to known methods. This is particularly advantageous for a hybrid heavy duty truck or bus, even more so for a vehicle in commercial traffic, thanks to the commonly known driving manner of providing nearly full or full power. Thanks to the provision of at least a predominant part of the required driving torque to the driving, wheels by the internal combustion engine, the temperature increase may be significant and enough to provide the heat mode when it otherwise would not have been possible. Regeneration of an exhaust gas particulate filter is one embodiment of a heat mode for the exhaust gas after treatment device. Other heat modes may include heating of different embodiments of catalysts included in the exhaust gas after treatment device. The fuel consumption which is needed to provide the predominant part of the required driving torque by the internal combustion engine is at least to a certain extent compensated by the reduction of energy needed for either providing additional heating to the exhaust gas after treatment device. It might otherwise be necessary to for instance run the exhaust gas after treatment device at a lower capacity, or to even stop the vehicle fin providing the heat mode for the exhaust gas after treatment device in some other manner.

According to an embodiment the method is used for regenerating an exhaust gas particulate filter in the exhaust gas after treatment device, and the step of establishing that a heat mode for the exhaust gas after treatment device is demanded includes establishing that regeneration of the exhaust gas particulate filter is demanded, such that exhaust gases from the internal combustion engine are heating the exhaust gas particulate filter for regeneration thereof.

The heat mode is very advantageous for providing a possibility to regenerate an exhaust gas particulate filter, such as a diesel particulate filter. If not regenerating such an exhaust gas particulate filter on either a regular basis, or at occasions when it is found necessary, particulate matter may clog the exhaust gas particulate filter such that ultimately the vehicle would have to stop driving in order to regenerate the exhaust gas particulate filter.

According to an embodiment the step of providing at least a predominant part of the required driving torque to the driving wheels by the internal combustion engine is performed during a closing of the clutch.

Closing of the clutch is generally performed when the engine is reconnected to the driveline. This most often occurs at either taking off from a stillstand, or at repowering of the driving wheels in order to continue driving. During this phase the transmission speed is adapted to the speed of the driving wheels, and for this energy is required. By performing the method according to this embodiment an additional temperature rise may be achieved for the heat mode.

According to an embodiment, when the required driving torque is less than a deliverable driving torque from the internal combustion engine, only providing the required driving torque by the internal combustion engine.

Hereby the effect of temperature rise in the exhaust gas is even more pronounced, since all required driving torque is provided by the internal combustion engine which produces hot exhaust gases that in turn heats the exhaust gas particulate filter.

According to an embodiment, during said clutch decoupling, the method controls the internal combustion engine to provide its maximum, or close to maximum, driving torque.

A more pronounced effect of temperature rise in the exhaust gas after treatment device and possibly the exhaust gas particulate filter is thus achieved since the internal combustion engine is working at or close to peak power.

According to an embodiment, when the required driving torque is greater than a deliverable driving torque from the internal combustion engine, in addition also providing by the electric machine a deficient driving torque in relation to the required driving torque and the deliverable driving torque by the internal combustion engine.

This way the electric machine is only providing driving torque when the internal combustion engine has reached its peak power, or in other words its maximum deliverable driving torque.

According to an embodiment the step of establishing that driving of the vehicle is demanded includes establishing, that a driving torque is demanded from the vehicle.

According to an embodiment the step of establishing that a driving torque is demanded from the vehicle is performed by sensing that an accelerator pedal in the vehicle is being depressed.

This is a simple manner of achieving the desired result of establishing that a driving torque is demanded from the vehicle.

According to an embodiment the step of clutch decoupling involves an adaption of a gear ratio of the transmission.

According to an embodiment the step of adaption of the gear ratio of the transmission is performed during an upshift of the gear ratio.

During an upshift of the gear ratio of the transmission the vehicle is normally accelerating. During, acceleration power is demanded for driving the vehicle, and during such conditions the elect of increasing the temperature of the exhaust gas after treatment device and possibly the exhaust gas particulate filter through hot exhaust gases is most pronounced.

According to an embodiment the step of establishing that regeneration of the exhaust gas particulate filter is demanded is established based on measuring a pressure difference between an outlet and an inlet of the exhaust gas particulate filter.

This is a simple manner and consequently cheap way of establishing that regeneration of the exhaust gas particulate filter is demanded.

According to an embodiment the clutch decoupling is performed during an acceleration phase of the vehicle from standstill.

During an acceleration phase of the vehicle from standstill the longest period for requiring a driving torque from the vehicle can be achieved, and hereby the greatest potential for a heat mode for the exhaust gas after treatment device and possibly a temperature rise in the exhaust gas particulate filter is at hand.

According to an embodiment the clutch decoupling is performed during driving.

According to an embodiment the method is performed by a control unit in the transmission of the vehicle.

By utilizing a control unit in the transmission of the vehicle for performing the method a control unit which is also controlling the clutch is utilized so that a smooth control without competing or even colliding requirements between different control units is achieved.

According to an embodiment the method further comprises the step of performing regeneration of the exhaust gas particulate filter when a temperature of the exhaust gas particulate filter is above a predetermined temperature.

Hereby the best possible performance of the regeneration of the exhaust gas particulate is achieved.

According to an embodiment the method is arranged to be performed in a regeneration mode which satisfies the condition of establishing that regeneration of the exhaust gas particulate filter is demanded, which regeneration mode is arranged to set aside a normal hybrid driving mode, in which normal hybrid driving mode at least a predominant part of the required driving torque to the driving wheels is arranged to be provided by the electric machine.

For a hybrid vehicle of the kind according to the present disclosure it is desirable to utilize a hybrid mode to the largest possible extent. This is hence the normal driving mode for such a vehicle. Such a driving mode includes driving the vehicle by the electric machine. While driving the vehicle by the electric machine no, or at least little, exhaust gases are produced by the internal combustion engine. The internal combustion engine may often even be shut down during this hybrid mode. Hence there will during this driving mode be no or at least only little heating of the exhaust gas after treatment device and possibly the exhaust gas particulate filter. Such a hybrid vehicle is during hybrid mode hence adapted to provide a predominant part of the required driving torque by the electric machine. During, a period of utilizing the present method this is consequently interchanged for a situation in which at least a predominant part of the driving torque is provided by the internal combustion engine. The result consequently becomes that heating of the exhaust gas particulate filter is achieved.

According to a second aspect of the present disclosure a computer program is disclosed which comprises program code means for performing the method steps when said program is run on a computer.

According to a third aspect of the present disclosure a computer readable medium is disclosed which carries a computer program comprising program code means for performing the method steps when said program product is run on a computer.

According to a fourth aspect of the present disclosure a control unit for controlling a clutch is disclosed, the control unit being configured to perform the method steps.

This control unit is preferably the Electronic Control Unit (ECU) of the gearbox. According to a fifth aspect of the present disclosure a vehicle is disclosed which comprises an internal combustion engine, an electric machine, a transmission, driving wheels and a control unit, wherein the control unit is adapted to perform the method in the vehicle.

The vehicle will be provided with the advantage of utilizing a certain driving period for providing a heat mode for the exhaust gas after treatment device, and possibly for re-generation of the exhaust gas particulate filter for achieving a surprisingly good effect of heating the exhaust gases. This is in more detail explained above in connection with the first aspect of the present disclosure.

According to an embodiment the transmission is an automated type of transmission.

This type of vehicle is mostly best controlled by an automated type of transmission to automatically achieve the desired effects.

According to an embodiment the internal combustion engine is a diesel fuel engine.

Due to the composition of the exhaust gases from a diesel fuel internal combustion engine, an exhaust gas after treatment device including possibly an exhaust gas particulate filter is, or at least will be, required in order to meet exhaust emission regulations in many countries. Due also to the need for bringing such devices up to certain temperatures, such as for regeneration of an exhaust gas particulate filter, the present method is particularly advantageous here for.

According to an embodiment the internal combustion engine is configured to provide a relatively low maximum torque and the electric machine is configured to provide a deficient driving torque in relation to a required driving torque and the deliverable driving torque by the internal combustion engine for achieving proper driving performance.

According to an embodiment the vehicle comprises a powertrain with the following components arranged in series: the internal combustion engine, a clutch, the electric machine and the transmission. Other orders may however be prudent.

According to an embodiment the vehicle is constituted by a bus.

Purely as non-limiting examples, a city bus in commercial traffic usually starts and stops regularly and often and so does a refuse lorry. During these stops and taking offs many occasions for performing the method according to the present disclosure will be provided.

BRIEF DESCRIPTION OF THE DRAWINGS

A non-limiting embodiment of the disclosure will now be described with the aid of the accompanying drawings, in which.

DETAILED DESCRIPTION

Figure 1:
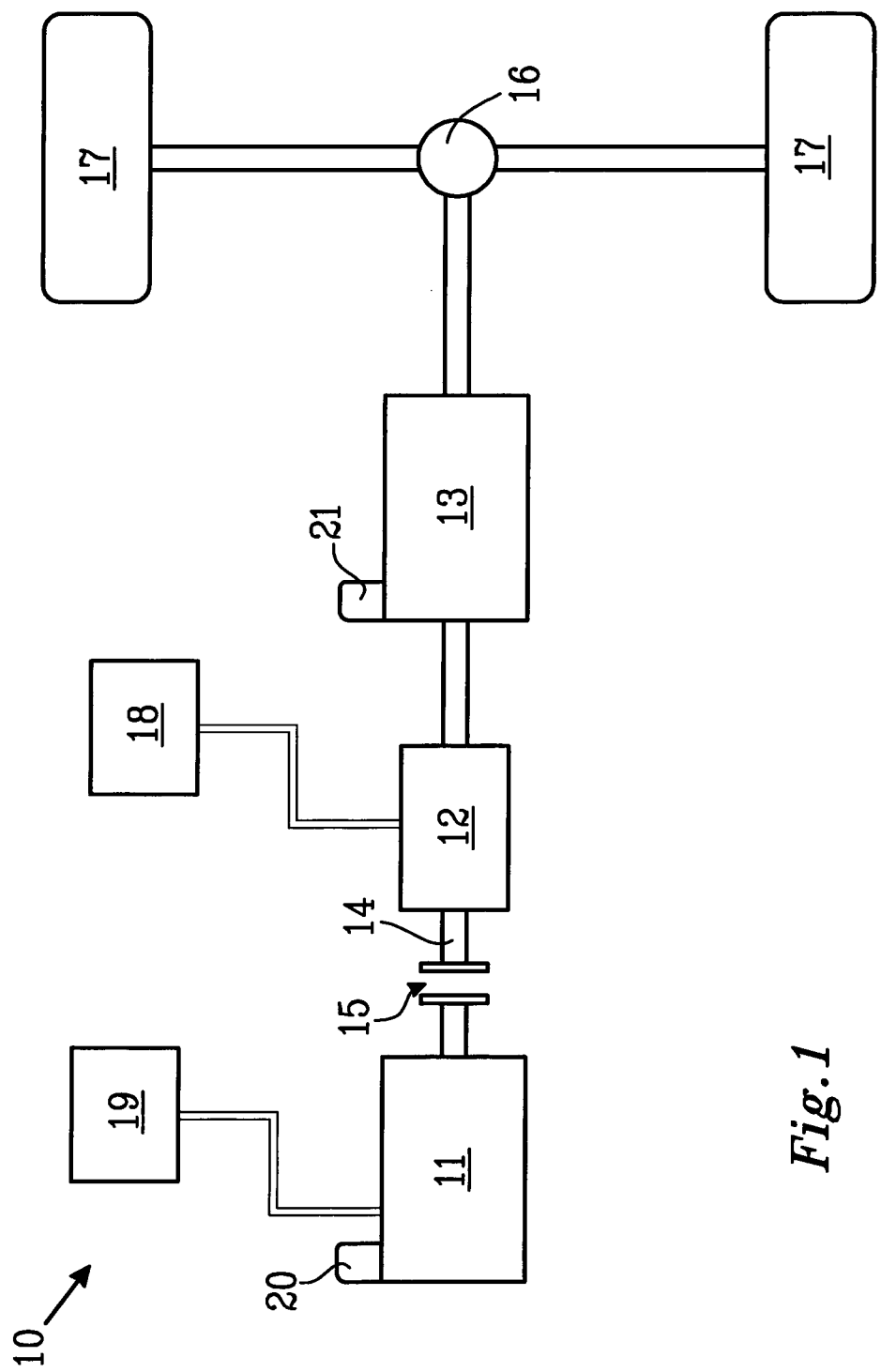
FIG. 1 is a schematic diagram of a hybrid vehicle.

With reference to FIG. 1 a hybrid vehicle 10 of the kind relevant for the present disclosure will now be described. A hybrid vehicle 10 which is relevant for the present invention is generally a diesel fuel vehicle for commercial purposes, such a heavy duty truck or bus. Other types of vehicles running on other types of fuels may however also be relevant. Vehicles running on fuel which are prone to emit exhaust gases comprising contents which should be limited through the use of exhaust gas after treatment system are however more relevant. Especially ones having an exhaust as particulate filter which should be regenerated intermittently. Hence a diesel particulate filter is one embodiment of an exhaust gas particulate filter according to the claims.

It is noted that the following description is focussing on an embodiment in which the heat mode according to the claims is exemplified with regenerating of the exhaust gas particulate filter. However, a heat mode of the kind disclosed may advantageously be used for heating any part or combination of parts included in an exhaust gas after treatment system.

The hybrid vehicle 10 comprises a diesel fuelled internal combustion engine (ICE) connected through a drive shaft 14 and a clutch 15 to an electrical machine 12 and a transmission in the form of a gearbox 13. The drive shaft 14 is furthermore connected to a differential 16 and to driving wheels 17 of the vehicle 10. Both the internal combustion engine 11 and the electrical machine 12 are mechanically connected to the driving wheels 17. An alternative could be that the internal combustion engine 11 is connected to a first set of driving wheels and that the electrical machine 12 is connected to a second set of driving wheels. The vehicle may be of front wheel drive type, of back wheel drive type or of multiple wheel drive type. The gearbox 13 may be a hilly automatic type of gearbox or an automated manual type. Other types of gearboxes 13 may also be relevant. Generally, in order for the disclosed method to function rightly there should be a connection between the internal combustion engine 11 and the driving wheels 17. An Automatic Manual Transmission (AMT) type of gearbox is computer regulated and therefore fully capable to implement the disclosed method.

The electrical machine functions both as a driving machine for driving of the vehicle 10, and as a generator storing energy for later use for i.a. driving of the vehicle 10. The electrical machine is connected to an energy storage 18, most often a battery or set of batteries.

Another hybrid layout working well with the present disclosure is one in which the internal combustion engine 11 is connected through a first shaft to the driving wheels 17 and the electrical machine 12 is connected through a second shaft to the driving wheels 17 of the vehicle.

The internal combustion engine 11 is connected to an exhaust gas after treatment system (EATS) 19. The EATS 19 comprises at least a diesel particulate filter (DPF), but may also comprise such exhaust gas purifying devices as one or several of a NOx-trap, a Selective Catalytic Reduction (SCR) catalyst and a Diesel Oxidation Catalyst (DOC) located in any desirable order for proper functionality. A heat mode according to the disclosure may be adapted to provide heat energy for any one or a combination of these devices.

The clutch 15 is mechanically coupling the internal combustion engine 11 to the driveline and the drive shaft 14. The clutch 14 is adapted for connecting and disconnecting the internal combustion engine 1, such that a desired gear ratio may be chosen in the gear box 13 and such that the rotational speed of the internal combustion engine 11 may be adapted to the speed of the gear box 13 and the drive shaft 14. The clutch 15 is generally controlled by an Electronic Control Unit (ECU) of the gear box, ECUgear 21.

The internal combustion engine 11 is generally controlled by an Electronic Control Unit (ECU) of the internal combustion engine, ECUICE 20.

Figure 2:
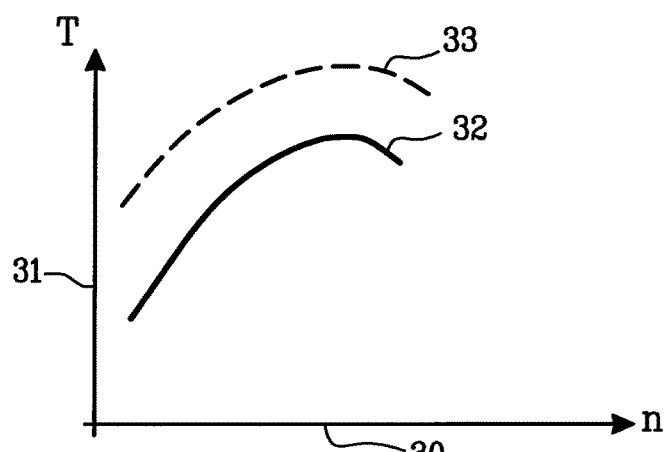
FIG. 2 is a schematic diagram of a driving torque and engine speed of a vehicle according to FIG. 1.

Turning to FIG. 2, a diagram showing a schematical outline of a driving torque, T on the abscissa 30 and the revolution speed a of the internal combustion engine 1 on the ordinate 31 is disclosed. The dotted line 33 represents the total torque, Ttot, which is available for driving of the vehicle 10. This line could also be said to represent a hypothetical engine which a non-hybrid vehicle of the same size would be provided with. However, to i.a. reduce fuel demand and exhaust emissions, the internal combustion engine 11 has been reduced in size to deliver a torque, T|CE, represented by the continuous line 32, and the deficiency between the totally available driving torque 33 and the driving torque which is deliverable by the internal combustion engine 11 is provided by the electrical machine 12, TEM. The maximum torque which may be delivered by the internal combustion engine, Ticemax, will in the following be called a deliverable driving torque from the internal combustion engine.

The torque TEM which is actually deliverable by the electrical machine 12 is often 5 larger than what is represented by the difference between the curves 33 and 32. The deliverable torque is however in most vehicles instead limited to the curve 33 to represent a standard engine such that the driver of the vehicle is recognising its behaviour. A further reason for such a limitation is not to overload the electrical machine 12.

The general function of the cooperation between the internal combustion engine 10 11 and the electrical machine 12 is that a torque which is delivered for driving the vehicle 10 is based on a torque demanded by a driver of the vehicle 10. The torque delivered may originate from any one of the internal combustion engine 11 and the electrical machine 12, or from both together. Conditions such as driving situations, driving modes and ambient conditions together determine the relationship between the deliveries of driving torque 15 between the two machines.

In general and based on the above, the torque delivered to the drive shaft 14 and to the driving wheels 17, Ttot, may be described by the following equation:

$$T_{tot} = T_{ICE} + T_{EM} \quad (1)$$

Figure 3:
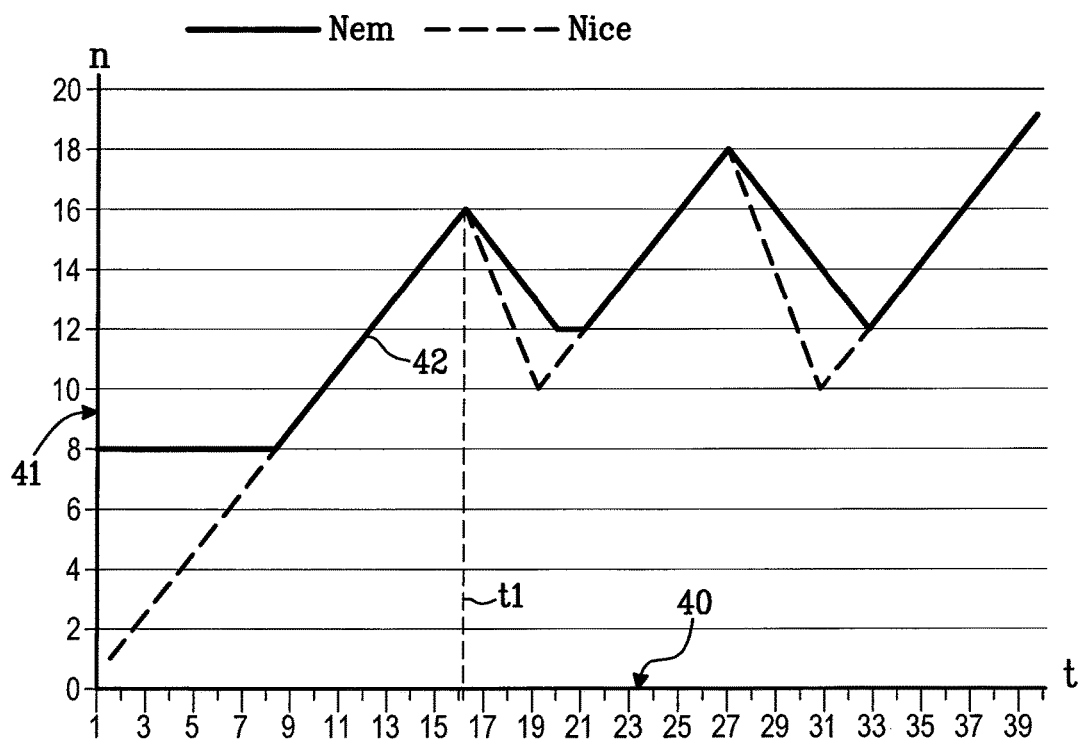
FIG. 3 is a schematic diagram of a typical driving situation for any kind of vehicle.

In FIG. 3 a schematic diagram showing a hypothetical driving situation is represented by curve 42. On the abscissa 40 a time t is represented, and on the ordinate the revolution speed n of the internal combustion engine 11, nICE, and of the electrical machine nEM of the vehicle 10 is represented. Initially the vehicle 10 is standing still and taking off. Speed increases through acceleration and at a certain time ti the gear box 13 changes gear ratio a first time. During acceleration this gear ratio change is from a low numbered gear to a higher numbered gear. It is not necessary during these gear ratio changes to change between gear ratios having consecutive numbers, but it may be advantageous to skip certain gear ratios. The changing of gear ratio is taking place a number of times until a steady state gear ratio is found, which is adequate for the driving which is demanded by the driver. During another driving cycle the gear ratio may also be decreased and/or increased again such that the vehicle 10 at all times is driven in an efficient manner. During this steady state gear ratio driving, the vehicle may still change speed within certain limits in a known manner.

During a change of gear ratio, such as at time ti, the clutch 15 disconnects the internal combustion engine 11 from the drive shall 14 such that the gear box 13 through its control unit ECUgear 21 may adapt the gear ratio to the next adequate gear ratio, and generally simultaneously adapt the revolution speed n of the gear box 13 to the revolution speed of the drive shaft 14 through sliding of the clutch 15. During vehicle acceleration and the corresponding upshift in the gear box 13, this means that the revolution speed n of the gear box 13 and of the internal combustion engine 11 is lowered.

Figure 4A:
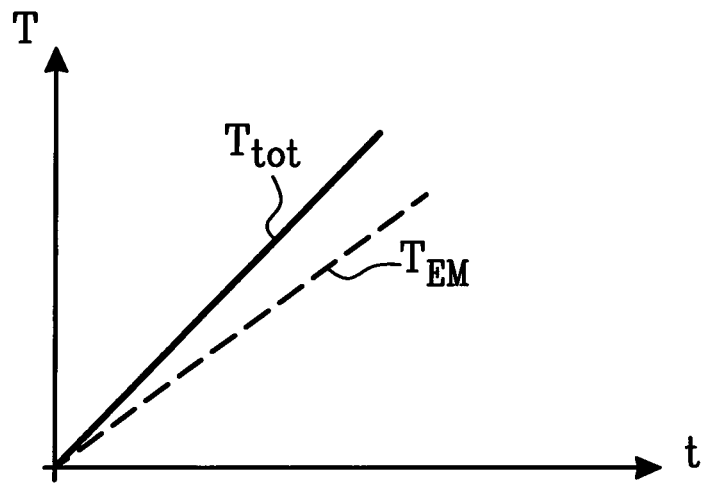
FIGS. 4a and 4b are schematical diagrams of a hybrid driving mode and a regeneration driving mode according to the present disclosure of a vehicle according to FIG. 1.

Turning to FIG. 4a, a normal hybrid driving mode for a vehicle 10 of the kind discussed above is schematically disclosed. Here it can be seen that the required driving torque from the vehicle 10 is firstly delivered by the electric machine 12. Only if more driving torque is required than what the electric machine 12 is arranged to deliver, the internal combustion engine 11 is called upon for delivering driving torque. In this driving mode a predominant part of the required driving torque for driving the vehicle 0 hence is delivered by the electric machine 12. There may be other reasons for delivering driving torque from the internal combustion engine 11 than the one described, but this is either known in the an or trade secrets controlled by each vehicle manufacturer and are as such not part of the present disclosure. FIG. 4a is merely one representation of a possible situation.

By the wording a 'predominant part' is here meant a ratio of more than 50% of the torque delivered, Ttot, to the vehicle 10 is delivered by the electric machine 12, TEM.

In other words, the torque delivered to the drive shaft 14 during a normal hybrid driving mode can consequently be described mathematically by the following equation:

$$T_{ICE} < T_{EM} \quad (2)$$

It has surprisingly been found that if, at times when the clutch 15 is at least partially decoupling the transmission, and particularly when the clutch 15 has been opened and is again closing the mechanical connection between the internal combustion engine 11 and the drive shalt 14, the relationship between the delivery of torque Ttot to the vehicle 10 is altered, such that a predominant part of a required driving torque to the driving wheels is delivered by the internal combustion engine 11 instead of by the electric machine 12, the exhaust gases from the internal combustion engine 11 will deliver heat energy to the EATS 19 and the DPF to such an extent that there will be a noticeable difference in the temperature of the exhaust gases as compared to the opposite situation. This temperature increase will result in a temperature increase of such an extent that the exhaust gases from the internal combustion engine 11 are beating the exhaust gas particulate filter 19 so that regeneration may be achieved even without additional external heating.

The Electronic Control Unit (ECU) of the gear box, ECUgear 21 is responsible for providing the heat mode and will provide the ECU|CE 20 with control signals for the general control of the regeneration of the exhaust gas particulate filter 19.

When the required driving torque exceeds the deliverable driving torque by the internal combustion engine 11 the electric machine 12 is also engaged by the Electronic Control Unit (ECU) of the gear box, ECUgear 21 to provide the deficient driving torque to the vehicle 10.

Figure 4B:
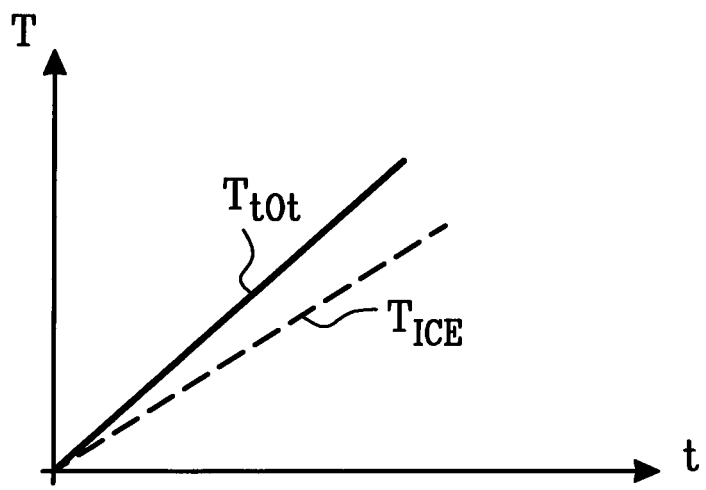

By the wording a 'predominant part' is here meant a ratio of more than 50% of the torque delivered, Ttot, to the vehicle 10 is delivered by the internal combustion engine 11, TicE— This situation is disclosed schematically in FIG. 4b, FIG. 4b may be denominated a regeneration driving mode for the vehicle 10.

In other words, the torque delivered to the drive shaft 14 during a regeneration driving mode can consequently be described mathematically by the following equation:

$$T_{ICE} > T_{EM} \tag{3}$$

Figure 5:
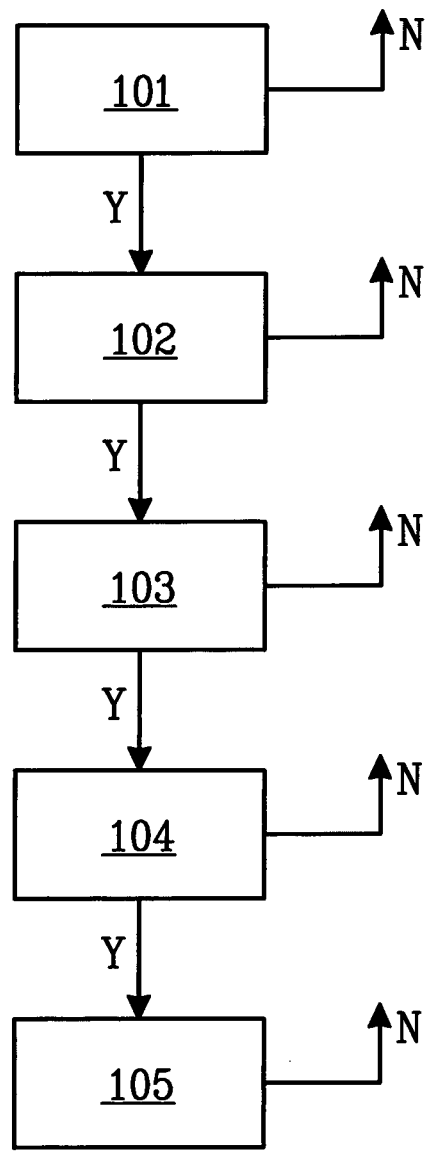
FIG. 5 is a block diagram of the method disclosed.

The method according to the present disclosure is disclosed, in FIG. 5. The method is generally performed by a vehicle 10 of the kind disclosed in relation to FIG. 1. The method may preferably be performed by Electronic Control Unit (ECU) of the gear box, ECUgear 21 in the vehicle 10. The method is initiated when the Electronic Control Unit (ECU) of the gear box, ECUgear 21 is establishing that regeneration of the exhaust gas particulate filter 19 is demanded 101. Then the Electronic Control Unit (ECU) of the gear box, ECUgear 21 is establishing that driving of the vehicle 10 is demanded 102, and during a period when the clutch is at least partially decoupling the transmission 103, the method continues with providing at least a predominant part of a required driving torque to the driving wheels by the internal combustion engine 104, such that exhaust gases from the internal combustion engine 11 are heating the exhaust gas particulate filter 19 for its re-generation. The method consequently continues with the step of performing regeneration of the exhaust gas particulate filter 19, 105, particularly doing so if and when it has been established a temperature of the exhaust gas particulate filter 19 is above a predetermined temperature. The predetermined temperature may preferably be the light-off temperature of the exhaust gas particulate filter 19 for proper regeneration.

The step of establishing that regeneration of the exhaust gas particulate filter is demanded 101 is established based on measuring a pressure difference between an outlet and an inlet of the exhaust gas particulate filter 19.

The method is preferably performed during an acceleration phase of the vehicle 10 from standstill or during driving, since during these conditions the effect of heating the temperature of the exhaust gases is most pronounced. However the method will provide a heating mode for the exhaust gases also during any time when the clutch is at least partially decoupling the transmission 13. One way of establishing that the clutch 15 is at least partially decoupling the transmission 13 is to measure the revolution speed of the two clutch discs. When the revolution speed at each side equals the other side the clutch 15 is connected. During separation and later bringing together again the two discs slip in relation to one another so that the force between them decreases and increases respectively. Another possible way to determine at the clutch 5 is at least partially decoupling the transmission 13 is to measure the force between the two rotating and slipping clutch discs. The step of establishing that driving of the vehicle 10 is demanded 102 includes establishing that a driving torque is demanded from the vehicle 10. A driving torque is normally demanded by a driver of the vehicle 10. This may be achieved by sensing that an accelerator pedal in the vehicle 10 is being depressed by the driver.

When the driving torque which the driver requests from the vehicle 10 is less than a deliverable driving torque from the internal combustion engine 11, it is preferable to only provide the required driving torque by the internal combustion engine 11, i.e. corresponding to the situation of step 104 in FIG. 5. This will gain an improved effect of increased exhaust gas temperature. During this step 104 the method controls the internal combustion engine 11 to provide its maximum, or close to maximum, driving torque in order to provide an improved and efficient exhaust gas heating. On the other hand, if the required driving torque which is requested by the driver is greater than a deliverable driving torque from the internal combustion engine 11, it is generally be necessary to also provide driving torque by the electric machine 12. The electric machine 2 will under these conditions provide a deficient driving torque in relation to the required driving torque and the deliver-able driving torque by the internal combustion engine 11. The deficient driving torque consequently corresponds to the following equation:

$$T_{deficient} = T_{EM} = T_{tot} - T_{ICE} \tag{4}$$

The step of providing at least a predominant part of the required driving torque to the driving wheels 17 by the internal combustion engine 104 is performed during a closing of the clutch 15. Closing of the clutch 15 is a particular part of the time during which the clutch 15 is at least partially decoupling the transmission 13, 103. The clutch 15 decoupling 103 involves an adaption of a gear ratio of the transmission 13, and especially an upshift of the gear ratio.

Tests of actual vehicles 10 which have been provided with a modification to the Electronic Control Unit (ECU) of the gear box, ECUgear 21 corresponding to the above disclosed regeneration driving mode have been performed. For a citybus having a 5 liter diesel engine driving a certain test cycle, it was observed that a temperature increase of the engine out exhaust vases of approx. 9° C. could be achieved. The test cycle was run during 40 minutes and at a distance of 15 km. The average speed of the test bus was 22 km/h, the maximum speed was 50 km/h and the stillstand was 26% of the total test cycle. This should be seen in the light of the approx. 250° C. which is normally needed to initiate regeneration of a diesel particulate filter 19.

According to an embodiment it is possible to provide some driving torque by the electric machine 12 also at low levels of required driving torque. The prerequisite is nevertheless that a predominant part, i.e. more than 50% of the torque delivered, Ttot, to the vehicle 10 is delivered by the internal combustion engine 11.

In contrast to what is disclosed, in FIG. 4b it is possible that no driving torque at all is delivered by the electric machine 12 in the regeneration driving mode, such that all of the required driving torque is delivered by the internal combustion engine 11. This may be the case both when the requested driving torque is less than the deliverable driving torque from the internal combustion engine 11, and when the requested driving torque is greater than the deliverable driving torque from the internal combustion engine 11. Hence, the electric machine 12 could be completely blocked from providing driving torque to the vehicle 10.

It is even possible to run the electrical machine 12 to deliver a negative driving torque. The result would be an increased load on the internal combustion engine 11 to achieve an even higher temperature increase in the heat mode for the exhaust gas after treatment device 19 and the exhaust gas particulate filter 19.

In other words, the torque delivered to the drive shaft 14 during a regeneration driving mode and during conditions disclosed by the preceding paragraph can consequently be described mathematically by the following equation:

$$T_{tot} = T_{ICE} \qquad (5)$$

The method disclosed in connection with FIG. 5 may be provided as a computer program which comprises program code means for performing the method steps when the program is run on a computer. The computer program may be delivered on a computer readable medium.

The Electronic Control Unit (ECU) of the gear box, ECUgear 21, is one embodiment of a control unit for controlling a clutch according to the claims. The Electronic Control Unit (ECU) of the gear box, ECUgear 21 is configured to perform the method steps described above.

It should be noted that it is possible for the vehicle 11 to drive also when the clutch 15 is open. The electrical machine 12 may then drive the vehicle 1 singlehandedly.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

The invention claimed is:

1. A method for providing a heat mode for an exhaust gas after treatment device in a vehicle, the vehicle comprising an internal combustion engine, an electric machine, a transmission, and a clutch connecting the internal combustion engine to the transmission and driving wheels, the method comprising the steps of:
 establishing that a heat mode for the exhaust gas after treatment device is demanded,
 establishing that driving of the vehicle is demanded, and
 during a period when the clutch is at least partially recoupling the transmission after an adaption of a gear ratio of the transmission, providing at least a predominant part of a required driving torque to the driving wheels by the internal combustion engine, such that exhaust gases from the internal combustion engine heat the exhaust gas after treatment device.

2. A method according to claim 1, wherein the method is for regenerating an exhaust gas particulate filter in the exhaust gas after treatment device, and the step of establishing that a heat mode for the exhaust gas after treatment device is demanded is for establishing that regeneration of the exhaust gas particulate filter is demanded, such that exhaust gases from the internal combustion engine heat the exhaust gas particulate filter for regeneration thereof.

3. A method according to claim 2, wherein the step of establishing that regeneration of the exhaust gas particulate filter is demanded is established based on measuring a pressure difference between an outlet and an inlet of the exhaust gas particulate filter.

4. A method according to claim 2, further comprising the step of performing regeneration of the exhaust gas particulate filter when a temperature of the exhaust gas particulate filter is above a predetermined temperature.

5. A method according to claim 2, wherein the method is arranged to be performed in a regeneration mode which satisfies the condition of establishing that regeneration of the exhaust gas particulate filter is demanded, which regeneration mode is arranged to set aside a normal hybrid driving mode, in which normal hybrid driving mode at least a predominant part of the required driving torque to the driving wheels is arranged to be provided by the electric machine.

6. A method according to claim 1, comprising, when the required driving torque is less than a deliverable driving torque from the internal combustion engine, only providing the required driving torque by the internal combustion engine.

7. A method according to claim 1, comprising, during the clutch recoupling, controlling the internal combustion engine to provide its maximum, or close to maximum, driving torque.

8. A method according to claim 1, comprising, when the required driving torque is greater than a deliverable driving torque from the internal combustion engine, providing by the electric machine a deficient driving torque in relation to the required driving torque and the deliverable driving torque by the internal combustion engine.

9. A method according to claim 1, wherein the step of establishing that driving of the vehicle is demanded includes establishing that a driving torque is demanded from the vehicle.

10. A method according to claim 9, wherein the step of establishing that a driving torque is demanded from the vehicle is performed by sensing that an accelerator pedal in the vehicle is being depressed.

11. A method according to claim 1, wherein the step of adaption of the gear ratio of the transmission is performed during an upshift of the gear ratio.

12. A method according to claim 1, wherein the clutch recoupling is performed during an acceleration phase of the vehicle from standstill.

13. A method according to claim 1, wherein the clutch recoupling is performed during driving.

14. A method according to claim 1, wherein the method is performed by a control unit in the transmission of the vehicle.

15. A computer comprising program code for performing the steps of claim 1 when the program is run on the computer.

16. A non-transitory computer readable medium carrying a computer program for performing the steps of claim 1 when the program product is run on a computer.

17. A control unit for controlling a clutch, the control unit being configured to perform the steps of the method according to claim 1.

18. A vehicle comprising an internal combustion engine, an electric machine, a transmission, driving wheels and a control unit, wherein the control unit is adapted to perform the method according to claim 1 in the vehicle.

19. A vehicle according to claim 18, wherein the transmission is an automated type of transmission.

20. A vehicle according to claim 18, wherein the internal combustion engine is a diesel fuel engine.

21. A vehicle according to claim 18, wherein the internal combustion engine is configured to provide a relatively low maximum torque and the electric machine is configured to provide a deficient driving torque in relation to a required driving torque and the deliverable driving torque by the internal combustion engine for achieving proper driving performance.

22. A vehicle according to claim 18, wherein the vehicle comprises a powertrain with the following components arranged in series: the internal combustion engine, a clutch, the electric machine and the transmission.

23. A vehicle according to claim 18, wherein the vehicle is a bus.

* * * * *